HENRY C. STAEHLE
INVENTOR

Patented Jan. 18, 1944

2,339,433

UNITED STATES PATENT OFFICE 2,339,433

METHOD OF FORMING OPTICAL SURFACES ON PLASTIC MATERIAL

Henry C. Staehle, Rochester, N. Y., assignor to Eastman Kodak Company, Rochester, N. Y., a corporation of New Jersey Application December 7, 1940, Serial No. 369,099

1 Claim. (Cl. 18—59)

This invention relates to a method of forming accurate optical surfaces on plastic material and more particularly to a method of adding a desired correction to a molded plastic lens.

Considerable interest in the optical field has been given to the polymerized esters of methacrylic acid. These resins, in general, are perfectly clear and colorless, transmit a large proportion of ultraviolet light and are not affected by prolonged exposure to the sun. Some of them may be molded by the technique already applied to cellulose acetate and other thermoplastics by either the compression or the injection method. Lenses and other optical surfaces may be formed in particular from methyl methacrylate resin which, while having a softening temperature above many thermoplastic molding materials, can be compression molded at temperatures and pressures within practical limits. If injection molded, the resin is usually plasticized to make it flow more readily. While for most purposes the molded article will so nearly approximate the shape of the mold that any discrepancy in contour is negligible, in the case of molded lenses and other optical surfaces there appears to be sufficient variance between the final molded surface and the contour of the mold owing to shrinkage or other factors so that the molded lens cannot be employed in an optical system without being corrected to correspond to the mold contour. Such molded lenses, etc., do not lend themselves to being corrected by grinding and polishing which are of course undesirable steps provided they can be dispensed with.

An object of the present invention is a method of forming optical surfaces of desired specifications from plastic materials without the need of grinding or polishing such surfaces. Another object is a method of correcting the characteristics of a plastic lens without grinding or polishing.

I have found a novel and useful method of forming on molded lenses a desired curvature by adding to both surfaces a thin layer of the resin while in a flowable form, shaping the layer in a mold of the desired curvature and permitting the layer to harden while thus controlled. By my method large numbers of lens blanks can be injection or compression molded simultaneously and after treating, if necessary, to remove releasable strains they can be individually corrected by thus adding a thin wafer like layer of a solution of the resin, which becomes integral with the lens blank on hardening, and shaping it in a mold of the correct curvature. Because the dimensions of the corrective addition are small, the changes due to shrinkage and so forth are negligible and the resulting lens will have the desired curvature.

The invention will be more clearly understood by reference to the following detailed description and drawing in which Fig. 1 is an elevational view of a molded lens, the dotted line indicating the desired curvature.

Figure 1:
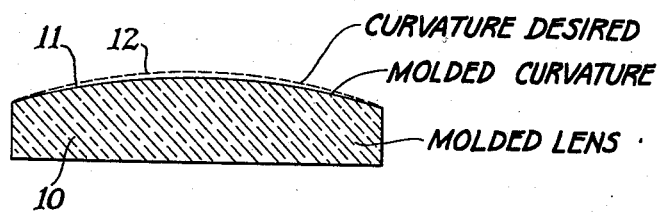
Figure 2:
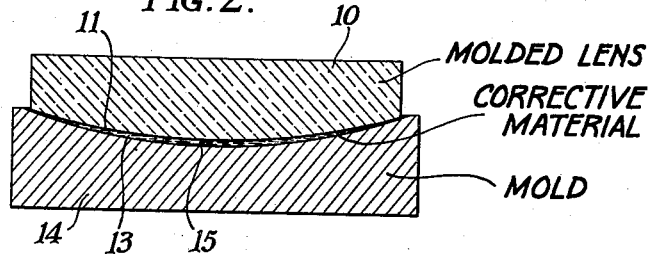
Fig. 2 is a view showing the manner in which the desired correction is added to the molded lens blank.
Figure 3:
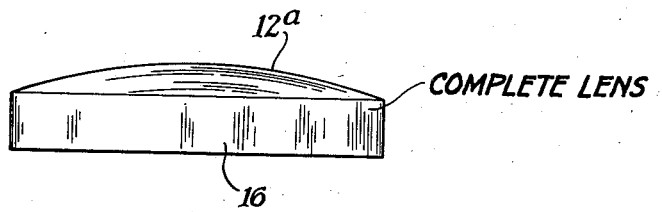
Fig. 3 is a view of the completed lens blank.

Referring to Fig. 1, 10 represents a molded methyl methacrylate lens having an actual curvature 11 and a desired curvature shown by the dotted line 12. This lens 10 is now transferred to mold 14 as shown in Fig. 2 which has a curvature 15 corresponding to the curvature 12 desired on lens blank 10. A polymerizable "syrup" composed of partially polymerized methacrylate and unpolymerized methacrylate and in some cases a catalyst, such as benzoyl peroxide, is flowed over the surface of the mold. The lens blank 10 is then held firmly against mold 14 which is preferably made of glass and the syrup is suitably heated by means not shown to cause its polymerization. This results in forming a thin integral correction on the surface of the lens blank 10; and the completed lens 16 separated from the mold as shown in Fig. 3 will have the desired curvature as shown at 12a. Since the dimensions of the corrective addition are relatively small the change in dimensions on aging will be within permissible limits of error and the lens may be employed in an optical system without further correction. It will be understood that the added layer is usually of the same composition as that contained in the lens blank, but it may be any other compatible material which will give a similar result. In some cases it may be desirable to treat the surface of mold 14 previous to the addition of the "syrup" to facilitate separation of the lens blank from the mold. I have found, however, that the lens will separate from the mold if the mold with the lens attached are immersed in water for a short time.

The process may be applied to the manufacture of lenses, prisms, optical flats and even to intricate parts having multiple surfaces such as a multi-lens pattern, a grid, a lenticular surface, or other complex shapes.

The following are typical examples of compositions for use in forming lens blanks and corrections thereon.

Example I

A blank of clear polymerized methyl methacrylate is compression molded into a convex lens in a mold having a desired curvature. This lens blank is permitted to stand for some time to permit releasable strains in the compressed blank to be released. The lens blank is then transferred to a mold having exactly the curvature desired wherein a thin layer of a solution of methyl methacrylate is placed. This solution consists of partially polymerized methyl methacrylate and monomeric methyl methacrylate. The lens surface is pressed against this thin layer of solution and the monomer which is present is readily absorbed in the resin of the molded blank, thus quickly causing the layer of solution to harden and become integral with the lens blank. When the solution is hard, the blank may be removed from the mold, thereby obtaining a surface with a curvature which is practically identical with that of the mold. If desired, a small amount of a catalyst such as benzoyl peroxide may be added to the solution to promote hardening of the solution. If desired the lens blank and solution may be heated during the corrective operation.

Example II

A blank of clear polymerized butyl methacrylate is compression molded into a lens having a desired curvature and then left to permit releasable strains to release. This lens is pressed against a thin layer of a solution composed of 20% polymerized butyl methacrylate and 80% monomeric butyl methacrylate contained in a mold having a curvature corresponding to that desired on the lens. The solution will soon harden and become integral with the lens which now has an optical surface of the required curvature.

Example III

A blank of ethyl methacrylate is compression molded into a lens having a desired curvature and treated to release strains. The lens is then pressed against a thin layer of a solution composed of 20% polymerized ethyl methacrylate and 80% of monomeric ethyl methacrylate contained in a mold having a curvature corresponding to that desired on the lens. The solution will soon harden and become integral with the lens which now has an optical surface of the required curvature.

Many other resins such an n-propyl methacrylate, isobutyl methacrylate, methyl acrylate, and common polymerizable materials such as styrene and vinyl acetate may be employed both for the lens blank and the base of the solution which forms the correction layer.

If the lens tends to adhere to the glass mold, immersion in water for a short time will cause it to separate therefrom.

While for commercial production it may be more desirable to injection or compression mold the plastic lens blanks they can be cut from a large piece of cast plastic or they can be molded in individual mold by polymerizing a solution of the monomer.

I claim:

A method of forming a plastic lens of accurate curvature which comprises molding under heat and pressure a polymerized plastic material into a lens blank having a surface of the desired curvature, relieving, by aging, releasable strains in the lens blank resulting from cooling and setting of the material, correcting the discrepancy in the curvature of said blank resulting from the release of said strains by adding a thin substantially unpolymerized layer of the same material to the lens surface and polymerizing the added layer in a mold of exactly the desired curvature, said added layer being so thin that distortion effects on said lens caused by polymerization of the thin layer are substantially within the limits of permissible error.

HENRY C. STAEHLE.